Jan. 4, 1938.   J. A. ST. CLAIR ET AL   2,104,472
AUXILIARY CHUCK
Filed July 19, 1935
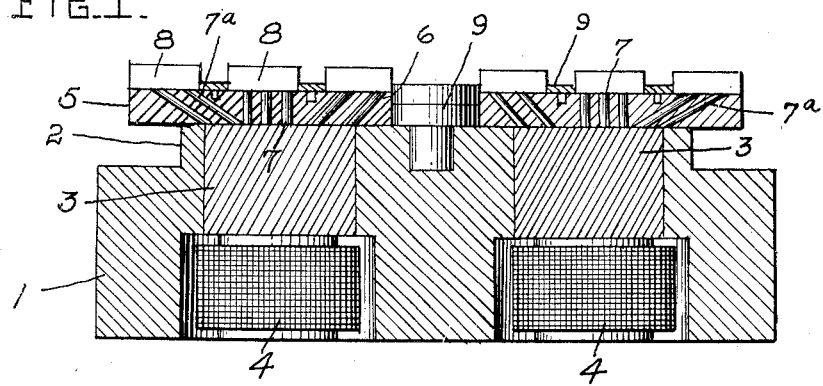
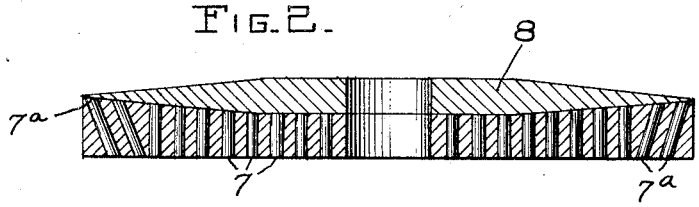
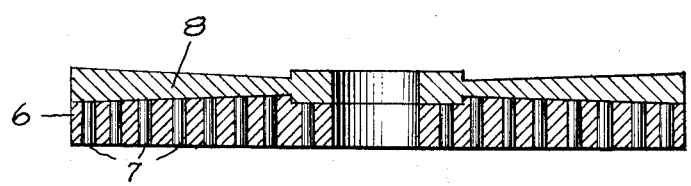
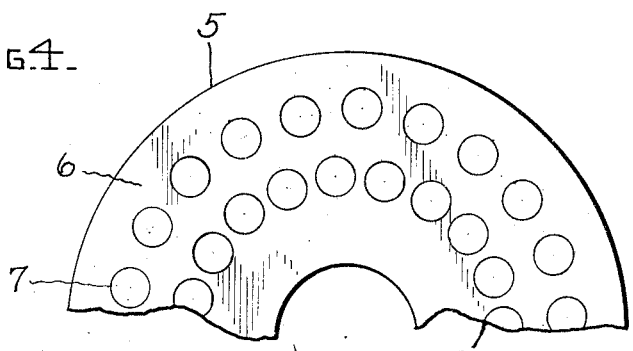
INVENTORS.
John A. St. Clair
Dewey E. Hommel.

Patented Jan. 4, 1938

2,104,472

UNITED STATES PATENT OFFICE 2,104,472

AUXILIARY CHUCK

John A. St. Clair and Dewey E. Gommel, Indianapolis, Ind.

Application July 19, 1935, Serial No. 32,184

2 Claims. (Cl. 175—367)

This invention relates to auxiliary chucks or plates adapted primarily for use with the usual or conventional form of magnetic chuck, one of the features being the provision of an auxiliary chuck applicable for use in connection with any form of magnetic chuck and interchangeable from one chuck to another.

An additional advantage is in so constructing the auxiliary chuck that work may be securely held in place thereon when the work is out of alinement with or at one side of the magnetic field of the main chuck.

It is also an advantage of this invention to so construct and assemble the parts that the element may be very cheaply manufactured, at the same time maintaining its strength and durability.

It is a further feature to so construct an auxiliary chuck that work having straight or irregular surfaces will be securely held in position thereon.

In the accompanying drawing,

Figure 1 is a sectional view of a magnetic chuck showing the auxiliary chuck in operative position thereon.

Figures 2 and 3 are sectional views through modified forms of the auxiliary chuck showing the same supporting work having uneven surfaces, and, Figure 4 is a detail plan view of one form of auxiliary chuck.

Referring to the drawing the numeral 1 designates an ordinary form of magnetic chuck having a head 2, through which are positioned any suitable number of poles 3 with which cooperate magnets 4, said magnets, when electrically energized, attracting metallic objects to the poles 3.

It has been found in practice that the field of operation of this form of chuck is limited and in order to broaden the field of operation we have provided an auxiliary chuck or plate 5, the body portion 6 of which is constructed of any suitable nonmagnetic material, while projecting through the body 6 from its lower to its upper face, is any suitable number of poles 7, of a structure to carry magnetic flux.

The poles 7 may be of any suitable shape and design, but are preferably in the shape of round pins which pass through the body 6 and these poles may be cast directly into the body or forced into orifices through the body with a driving fit, the body 6 being preferably cast around the poles for reducing cost of manufacture as well as producing a more solid and durable structure.

The plate or body 6 may be made in any suitable shape and design as best suitable for pieces being held, but is preferably in the form of a disc which may be of varying diameters as may be required to receive different sized objects.

In order to increase the scope of the auxiliary plate or chuck with respect to the magnetic field of the chuck 1 without increasing the size or extent of the poles 3 and magnets 4, certain of the poles 7, as shown in Fig. 1, may be disposed at an angle as indicated at 7a, so that the objects or pieces of work 8 may be securely held against the outer face of the auxiliary chuck 5, although the work may be partially or entirely out of line with the magnets 4 and poles 3. It will be understood that all the poles 7 may be extended vertically or a portion or all of them set at an angle, as shown at 7a, depending upon the class of work required to be done.

In grinding or treating metallic objects having uneven surfaces, as shown in Figs. 2 and 3, the top faces of the auxiliary chucks may be provided with surfaces to fit the contour of the objects being treated so that the objects or work 8 will be held solidly on the auxiliary chuck and against upwardly or downwardly springing action.

By providing the auxiliary chucks as shown, any suitable surface or configuration may be formed on one face thereof for accommodating work having various shaped contours without disturbing or changing the face of the ordinary magnetic chuck and in view of the fact that the present form of auxiliary chuck is merely rested on the face plate of the ordinary chuck, it requires but a moment of time to replace one form of auxiliary chuck for another auxiliary chuck for receiving work having a different contour.

The auxiliary chucks 5 and the pieces of work 8 are centered and held in proper position by means of rings or discs 9, which are held in place in any suitable manner.

What we claim is:

1. An auxiliary chuck adapted to cooperate with a main chuck, comprising a disk like body portion of non-magnetic material, a plurality of magnetic flux carrying poles embedded in said body portion and extending from face to face thereof, some of said poles having one end nearer the axis of said body portion than the opposite end, said poles extending in a staright line from end to end and being of uniform cross sectional area throughout their length.

2. An auxiliary chuck adapted to cooperate with a main chuck having a magnetic field, comprising a disk like body portion of non-magnetic material, and a plurality of magnetic flux carrying poles of uniform cross sectional area throughout their length and extending through said body portion in a straight line from end to end, a portion of said poles being at an acute angle to the vertical axis of said body portion, whereby the magnetic field of the main chuck is extended to an area larger than the face of the chuck.

JOHN A. ST. CLAIR.
DEWEY E. GOMMEL.